United States Patent
Turri et al.

(10) Patent No.: US 6,756,468 B2
(45) Date of Patent: Jun. 29, 2004

(54) COMPOSITIONS FOR COATINGS BASED ON (PER) FLUOROPOLYETHERS

(75) Inventors: Stefano Turri, Milan (IT); Carlo Pogliani, Milan (IT)

(73) Assignee: Ausimont S.p.A., Milan (IT)

( * ) Notice: Subject to any disclaimer, the term of this patent is extended or adjusted under 35 U.S.C. 154(b) by 205 days.

(21) Appl. No.: 09/758,235

(22) Filed: Jan. 12, 2001

(65) Prior Publication Data

US 2002/0147295 A1 Oct. 10, 2002

(30) Foreign Application Priority Data

Jan. 17, 2000 (IT) ..................................... MI2000A0038

(51) Int. Cl.$^7$ ..................... C09D 175/08; C08G 18/10; C08G 18/50; C08G 18/79; C08G 18/16
(52) U.S. Cl. ........................... 528/66; 528/48; 528/52; 528/53; 528/54; 528/56; 528/58; 528/67; 528/70; 528/73; 528/76
(58) Field of Search ............................... 528/48, 52, 53, 528/54, 56, 58, 67, 70, 73, 76, 66

(56) References Cited

U.S. PATENT DOCUMENTS

| | | | |
|---|---|---|---|
| 2,242,218 A | 5/1941 | Auer | 427/316 |
| 3,665,041 A | 5/1972 | Sianesi et al. | 568/601 |
| 3,715,378 A | 2/1973 | Sianesi et al. | 558/283 |
| 5,461,135 A | * 10/1995 | Malofsky et al. | 528/60 |
| 5,798,409 A | 8/1998 | Ho | 524/506 |

FOREIGN PATENT DOCUMENTS

| | | |
|---|---|---|
| EP | 0 239 123 A2 | 9/1987 |
| EP | 0 665 253 A1 | 8/1995 |
| EP | 0 702 041 A1 | 3/1996 |
| EP | 0 812 891 A2 | 12/1997 |

* cited by examiner

*Primary Examiner*—Rabon Sergent
(74) *Attorney, Agent, or Firm*—Arent Fox PLLC.

(57) ABSTRACT

Cmpositions for coatings having a dry content higher than 80%, preferably of about 85–90% by weight, based on polyisocyanates and PFPEs, completely crosslinkable also in a range of temperatures between 5° C. and 20° C., comprising the following components:

Component 1): mixture comprising:

1.a) Partially fluorinated prepolymers, having free NCO groups, obtained by reaction of (per)fluoropolyethers (PFPEs) diols having number average molecular weight Mn in the range 800–1,300 with the cyclic trimer of the isophorondiisocyanate, 1.b) non cyclic isocyanic trimer of hexamethylendiisocyanate, Component 2): (per) fluoropolyether (PFPE) diol with Mn in the range 350–700, preferably 500–650, component 3): inert organic solvent in crosslinking conditions, complement to 100% by weight of the composition.

17 Claims, No Drawings

COMPOSITIONS FOR COATINGS BASED ON (PER) FLUOROPOLYETHERS

The present invention relates to high dry content polyurethane compositions based on perfluoropolyether oligomers. Said compositions are used for application to various substrata, such as for example metals, ceramic and stony materials, plastic and glass surfaces and they are able to completely crosslink also at temperatures lower than 20° C., also of about 10° C., forming thin films having good mechanical and surface properties.

Coatings obtained from polyurethane formulations based on perfluoropolyethers (PFPE) are known in the prior art. According to EP 665,253 it is possible to prepare high dry content polyurethane resins, by crosslinking PFPEs having hydroxyl terminations and functionality comprised between 2 and 4, or mixtures thereof, with polyisocyanic adducts obtained by reaction of polyols with diisocyanates, of the type for example TMP-IPDI (trimethylolpropane-isophorondiisocyanate) having a ratio by moles 1/3). Said formulations have the drawback not to completely crosslink at a temperature of 25° C. or lower. Therefore the properties of the obtained coating are unsatisfactory as regards the chemical resistance, permeability and duration in the time.

From EP 812,891 bicomponent "no dirt pick up" formulations are known in which the PFPE resin diol is crosslinkable with prepolymers obtained by prepolymerization of a PFPE diol with polyisocyanates obtained by cyclotrimerization of HDI, IPDI or other monomeric diisocyanates, alone or in admixture therewith. The examples of this application describe formulations having a dry content higher than 70% by weight but not higher than 85% by weight. The "no dirt pick up" properties are good but it is desirable to further improve them. In conclusion, the protective coatings obtainable by crosslinking the prior art formulations, containing PFPEs having hydroxyl terminations, with polyisocyanates, have a lower crosslinking temperature limit, generally from +25° C., which compromises the possibility of application and complete crosslinking in the field and they do not show an optimal combination of properties as indicated hereinafter.

The need was therefore felt to have available PFPE-based polyurethane compositions combining the following properties:

applicability to dry contents>80% by weight, preferably in the range 85–90% by weight, filming capability and complete crosslinkability also at temperatures in the range 5° C.–20° C., as regards the properties of the coatings obtainable by said formulations:

improved chemical resistance and stability to UV ageing photooxidation, improved "no dirt pick us" surface properties, good mechanical properties and in particular good surface hardness (pencil hardness≧B) and abrasion resistance.

Compositions based on polyisocyanates and perfluoropolyethers meeting the combination of the above mentioned properties have now been surprisingly and unexpectedly found by the Applicant.

An object of the present invention are compositions for coatings having a dry content higher than 80%, preferably of about 85–90% by weight, based on polyisocyanates and PFPE, completely crosslinkable also in a range of temperatures between 5° C. and 20° C., said compositions comprising the following components:

Component 1): mixture comprising:
1.a) Partially fluorinated prepolymers, having free NCO groups, obtained by reaction of (per)fluoropolyethers (PFPEs) diols having number average molecular weight Mn in the range 800–1,500, preferably 1,000–1,200, with the cyclic trimer of the isophorondiisocyanate (IPDI), in said reaction the ratio in equivalents between the OH/NCO groups being in the range 0.20–0.25, 1.b) non cyclic isocyanic trimer of hexamethylendiisocyanate (biuret of HDI) having an absolute viscosity at 20° C. lower than 5,000 mPa.s, in component 1) the ratio referred to the dry product between the compound 1.b) and the compound 1.a) being in the range 10–90, preferably 30–60 parts of compound 1.b)/100 parts of compound 1.a);

Component 2): (per) fluoropolyether (PFPE) diol having Mn in the range 350–700, preferably 500–0650, the amount of PFPE diol component 2) being such that the ratio in equivalents between the OH and NCO groups in the composition is in the range 0.9–1.1;

Component 3): inert organic solvent under the crosslinking conditions, complement to 100% by weight of the composition.

The component 1.a) is obtainable by hot dissolving (for example 40°–80° C.) the trimer of IPDI and the (per) fluoropolyether diol in a solvent as those indicated in component 3), maintaining the stoichiometric ratio in equivalents OH/NCO within the indicated limits and a dry content in the range 65%–85% by weight. Then the polymerization catalyst is added, see later on, preferably dibutyltin-bis-isooctylthioacetate and the reaction is hot maintained until the theoretic NCO content is obtained, determined by titration according to ASTM D 2572.

As component 2 also (2a) mixtures of PFPE oligomer diols having Mn in the range 800–1,500, preferably 1,000–1,200, with PFPE oligomer diols having Mn in the range 350–700, preferably 500–650, can be used, in said mixtures of oligomers the weight ratio between, respectively, the high and low molecular weight oligomers being in the range 1/2–1/10, or alternatively the number average molecular weight of the mixtures of PFPE oligomer diols being lower than or equal to 700.

The inert solvent component 3) under crosslinking conditions is a solvent which does not react with the OH and NCO groups present in the composition of the invention.

As component 3) an aprotic dipolar solvent such as ethyl or butyl acetate is preferably used.

As cyclic trimer of isophorondiisocyanate (IPDI) of component 1.a, the commercial product Vestanat® T1890, Huels can for example be used.

As component 1.b) non cyclic isocyanic trimer of hexamethylendiisocyanate (biuret of HDI), the commercial products Tolonate® HDB-LV, Rhodia® or Desmodur® 3200, Bayer, can be used.

The (per)fluoropolyether diol compounds comprise one or more of the following (per)fluorooxyalkylene units $-(C_3F_6O)-$, $-(CFYO)-$, $-(C_2F_4O)-$, $-CR_4R_5CF_2CF_2O-$, $-(CF_2)_{a'}O-$, wherein Y is F or $CF_3$, $R_4$ and $R_5$ are equal to or different from each other and selected from H, Cl, a' is an integer equal to 3 or 4.

The preferred PFPE diol compounds for the compositions of the present invention are the following, wherein the (per) fluoropolyoxyalkylene units are statistically distributed along the chain:

aI) $-(C_3F_6O)m'\ (CFYO)n'-$ wherein the $(C_3F_6O)$ and (CFYO) units are perfluorooxyalkylene units statistically distributed along the chain; m' and n' are integers such as to give the above mentioned molecular weights, and m'/n' are comprised between 5 and 40, n' being different from 0; Y is F or $CF_3$;

when the unit (CFYO) is absent in this case n' can also be equal to 0;

bI) —$(C_2F_4O)p'(CYFO)$ q'—$(C_3F_6O)t'$— wherein p' and q' are integers such that p'/q' ranges between 5 and 0.3, preferably between 2.7 and 0.5 and such that the molecular weight is within the above indicated limits; t' is an integer with the meaning of m', Y=F or $CF_3$; t' can be 0 and q'/(q'+p'+t') is equal to 1/10 or lower and the t'/p' ratio ranges from 0.2 to 6;

cI) —$CR_4R_5CF_2CF_2O$— wherein $R_4$ and $R_5$ are equal to or different from each other and selected from H, Cl, the molecular weight such as to be comprised in the above mentioned limits, a fluorine atom of the perfluoromethylene unit can be substituted with H, Cl, or perfluoroalkyl group, having for example from 1 to 4 carbon atoms;

dI) —$(CF_2)_{a'}O$— wherein a' is an integer equal to 3 or 4. The (per) fluoropolyethers are obtainable by known processes. See U.S. Pat. Nos. 3,665,041, 3,242,218, 3,715,378 and EP 239,123.

The two end groups, equal to or different from each other, of the bifunctional (per)fluoropolyethers are of the type

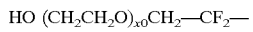

HO $(CH_2CH_2O)_{x0}CH_2$—$CF_2$— wherein x0 is an integer from 0 to 4, preferably from 0 to 2; in the preferred compounds x0=0; said end group being linked to the (per)fluorooxyalkylene unit by an oxygen atom but not by peroxidic sequences —O—O—.

The formulations according to the present invention advantageously combine the following properties:

complete crosslinkability at temperatures in the range +5° C.–+20° C.;

very high dry content when applied, also higher than 85%; therefore the formulations of the present invention are able to meet the most restrictive rules in terms of VOC (volatile organic compound) emissions and therefore they can be applied also in crowded urban places;

improved properties of "no dirt pick up", waterproofing, chemical resistance and abrasion-resistance;

high surface hardness (pencil hardness≧B);

high gloss and transparency;

good mechanical properties such as for example high hardness and flexibility.

It has been surprisingly found that the biuret of HDI component 1.b) as above defined, at the indicated crosslinking temperatures forms homogeneous mixtures both with the partially fluorinated prepolymers having free NCO groups component 1.a) and with the PFPEs diols component 2) as above defined. Other commercial crosslinking agents as the isocyanurate trimers, have not this property, as described in the comparative Examples.

Furthermore, the number average molecular weight of component 2) comprised in the above indicated limits allows to obtain an almost instantaneous homogeneous mixture with the free polyisocyanates of component 1.b) (not prepolymerized).

The compatibility among said components makes it possible the preparation of formulations having a high titre of dry product and reduced viscosity as requird for the application in the field.

The use of PFPE diol mixtures component 2), having bimodal distributions of the molecular weight allows to further improve the above indicated properties and in particular the "no dirt pick up" properties.

The compositions according to the present invention can be formulated both as monocomponent and as bicomponent, therefore they can be obtained by mixing the components 1.a), 1.b) and 2) with the solvent, or the same components are suitably combined to give the bicomponent formulation A (components 1.a+1.b) and B (component 2), the solvent being added in A and/or in B.

The obtained formulations are limpid and macroscopically transparent.

The compositions of the invention are crosslinked by addition of a catalyst (only at the time of the use). The chemical classes of catalysts are well known, the metal or amine ones commonly used in the paint formulations can be mentioned, for example: tertiary amines such as triethylendiamine, N-ethyl-ethylendiamine, tetramethylguanidine, dimethyl cyclohexylamine, diazobicyclo octane, etc.; organometal catalysts such as dibutyltindilaurate, tin octanoate, cobalt naphthenate, vanadium acetylacetonate, dimethyl-tin-diethylhexanoate, dibutyltin diacetate, dibutyltin dichlodride, and mixtures thereof. The catalyst is added in concentrations generally ranging from 0.1 to 2% by weight and preferably from 0.5 to 1%.

To the formulations of the invention additives such as for example pigments and fillers, preferably dispersed or predispersed in component 2), can be added. When silica having an opacifying action of the coating are used, they must be incorporated in a minimum amount in order to avoid worsenings (brittleness) of the mechanical properties. Pigments can be selected from the natural, synthetic inorganic and organic ones. As an example of inorganic pigments it can be mentioned: metal oxides (titaniun dioxide, iron oxides, mixed oxides of Ni, Co, Zn, Ti, or Cr, Cu or Fe, Ni, Cr, Mn, cobalt aluminates); organic pigments (derivatives from anthraquinone, quinacridone, tetrachloroisoindolinone, diketoperylene, phthalocyanines, etc.). Fillers as well as inert pigments and any other type of additive, are added to the dispersion under a very fine size, generally with sizes lower than 100 microns, preferably lower than 10 μm, in amounts up to 15% by volume. Other examples of compounds usable as fillers are: polyamides having 20–100 microns sizes, glass spheres such as zeolites, etc.

Other optional additives are thixotropic agents, polymer dispersing agents acrylic, silicone, polyurethane, polyamine or having a carboxylic or non ionic functionality; stretching, anticissing, antifoam additives, etc.; additives to reduce photooxidation (UV adsorber for example hydroxybenzophenone derivatives, hydroxybenzotriazole, etc.) and HALS (hindered amines, for example derivatives from tetramethyl-piperidine, etc.).

The pot life, defined as the necessary time to double the initial viscosity of the formulation, for monocomponent formulations maintains high both at 20° C. and at 50° C., in a closed vessel in absence of the crosslinking catalyst. The pot life is generally of at least 4 hours at 50° C. and at least 8 hours at 20° C.

By adding to the formulation small amounts (10–50 ppm) of a suppressor of the catalyst used for the synthesis of the prepolymer component 1.a), for example benzoyl chloride, phosphoric acid or Irganox® MD, the shelf life of the monocomponent formulation is of various days at room temperature.

The application tachniques are the conventional ones for protective coatings, such as for example spray-gun, brush, roll. In the preferred application technique by spray-gun the suitable viscosities for the formulations are in the range 100–500 mPa.s.

Besides in the case of monocomponent formulations the viscosity values at 50° C. are sufficiently low also with the highest dry product contents, therefore allowing a correct application using the above indicated techniques.

The formulation pot-life is of about 10 minutes from the time of the addition of the crosslinking catalyst and therefore when said formulations are spray applied, it is preferable to use guns equipped with a system of mixing heads, optionally heatable, heads known in the prior art and commercially available, wherein the addition of the catalyst at the gun head at the spray-time, with optional recycle of the not sprayed formulation, is involved.

The coatings obtainable by crosslinking at room temperature of the formulations according to the present invention are homogeneous and transparent films, having a 5–100 microns, preferably 30–50 microns, thickness.

The following Examples describe the invention with non limitative purposes.

EXAMPLE 1

Synthesis of the Prepolymer Component 1.a): from a PFPE Diol Having Number Average Molecular Weight of about 1,100 by Reaction with an IPDI Trimer (Vestanat®)

In a 500 ml four-necked glass flask equipped with mechanical stirrer, thermometer, condenser and maintained under nitrogen atmosphere, 100 g of Vestanat T1890 (Huls) equal to 0.408 eq of NCO groups, and 48.7 g of anhydrous ethyl acetate are introduced. The mixture is heated up to 70° C. under stirring until dissolution of the polyisocyanate and then 46.2 g of PFPE diol having the following structure (I)

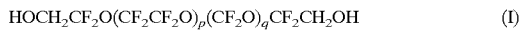

$$HOCH_2CF_2O(CF_2CF_2O)_p(CF_2O)_qCF_2CH_2OH \quad (I)$$

are fed, wherein p=6.43 and q=3.06, having molecular weight 1126 (by $^{19}$FNMR), hydroxyl equivalent weight 566, C2/C1 ($C_2F_4O/CF_2O$) ratio 2.1 and polydispersity (Mw/Mn by GPC) 1.2, said PFPE diol containing 0.0816 eq of OH groups. 0.2 g of Dabco 131 catalyst (butyltin-bis-isoctyl-thioacetate tin salt, Air Products) dissolved at 5% in butyl acetate are added. The reaction mixture, initially turbid, becomes limpid after 15 minutes. Heating is continued for 3 hours and, at the end of the reaction controlled by $^{19}$F NMR from the disappearance of the band of the groups $CF_2CH_2OH$ at −81 and −83 ppm, the prepolymer solution having the following properties:

Dry residue=78.2%, is cooled and discharged.

The dry residue is determined after evaporation of the volatile fraction, after heating test in an airy stove at 110° C. for 60 minutes of about 0.5 g of paint exactly weighed in an aluminum pan having 5 cm diameter.

Equivalent weight NCO (titration with dibutylamine/HCl, ASTM D2572)=570 g/eq

Viscosity (ASTM D2196, with Brookfield viscometer) at 20° C.=5,600 mPa.s

Viscosity (ASTM D2196, with Brookfield viscometer) at 50° C.=520 mPa.s

EXAMPLE 2

Preparation and Characterization of a Monocomponent Formulation According to the Present Invention Obtained by Using the Fluorinated Prepolymer Containing Free NCO Groups of Example 1, Biuret of HDI and PFPE Diol Having Molecular Weight 400

A formulation is prepared which contains 10 g (0.0175 eq. of NCO) of isocyanic prepolymer of Example 1, 3.91 g (corresponding to 0.0213 eq of NCO) of biuret of HDI (Tolonate® HDB-LV Rhone Poulenc), having viscosity lower than 5,000 mPa.s, 7.76 g (equal to 0.0388 eq of OH groups) of PFPE diol having structure (I) and molecular weight 400 (determined by $^{19}$FNMR), equivalent weight 200, and 0.19 g of Tinuvin® 292 (CIBA), 0.13 g of Tinuvin® 1130 (CIBA), 0.25 g of Tinuvin® 400, as photostabilizing additives.

The formulation looks macroscopically homogeneous already at room temperature (20° C.). The dry content is of 91%, and the absolute viscosity 1,340 mPa.s at 20° C. and 210 mPa.s at 50° C.

Determination of the pot life as the time required to double the value of the initial viscosity in closed vessel sheltered from moisture, at the temperature of 20° C. (between brackets, the viscosity value):

on the formulation as such: about 8 hours (2,890 mPa.s), after dilution with butyl acetate to a dry content of 85% (410 mPa.s at zero time): 8 hours (748 mPa.s), after dilution with butyl acetate to a dry content of 80% (140 mPa.s at zero time): 8 hours (280 mPa.s).

EXAMPLE 2A

Application of the Formulation of Example 2, and Characterization of the Obtained Coating 0.065 g of dibutyl tin dilaurate DBTDL are added to the composition of Example 2. It is mixed and the composition is applied by a film-spreader (10 mils opening) on clean and dried supports, formed respectively by glass, chromium-plated aluminum (Q-panel Al-36 Varwick-Massa), white polyurethane primer (Ecip Sistemi S.p.A), in order to carry out the tests reported hereunder. Crosslinking is continued for 7 days at the temperature of +18° C., and relative humidity in the range 50–60%.

A homogeneous and transparent polymer film is at the end obtained, which analyzed by IR spectroscopy shows absence of the band at 2260–2270 cm-1 (NCO band), and besides having the following properties:

Thickness (ASTM D1186-81): 40 microns

Chemical resistance:>200 double strokes MEK

The chemical resistance test consists in rubbing the coating with a cotton flock soaked in MEK, exerting a weight force of about 1 kg. The coating passes the test if the double strokes necessary for removing the film continuity are over 100.

Hardness (pencil, ASTM D3363): HB-F

Hardness (buchholtz, ISO2873): 81

Hardness (Koenig pendulum, DIN 53 157): 120 s

Transparence (spectroscopy UV-vis): T>95% for wave lengths>400 nm

Gloss (60°, ASTM D523, on opaque white primer): 78

Adhesion (crosscut test ASTM D3359): 100% on polyurethane primer, 100% on chromium-plated aluminum, 0% on glass Bending (conic spindle MU 515): <3.13 mm Contact angle with $H_2O$ (Aticelca MC 21–72): 108°

Resistance to photooxidation in the time (ASTM G53):

>90% of gloss retention colour variation (Delta E): 2 after 4,000 hours of QUV-B test (The QUV-B cycle consists of an exposure step at the UVB light for 4 hours at the temperature of 60° C., and of an exposure step to saturated vapour, for 4 hours at 40° C. in absence of light).

EXAMPLE 3 (COMPARATIVE)
Repetition of Example 2 Substituting the Component 1.b) Biuret of HDI With the Trimer of HDI The same formulation of Example 2 is prepared, but replacing the biuret of HDI with a same amount, as equivalents of NCO groups, of isocyanurate trimer of HDI (4.16 g of Tolonate® HDT, HDT-LV or Desmodur® 3300). The formulation has a whitish-opalescent colour and consists of two distinct phases, which remain after gelling, also after addition of DBTDL. It is therefore not possible to obtain a transparent and homogeneously crosslinked film.

EXAMPLE 4 (COMPARATIVE)
Repetition of Example 2 Substituting the Component 2—PFPE Diol With Molecular Weight 400 with a PFPE Diol Having Molecular Weight 1000

A formulation is prepared wherein the isocyanic component (component 1) of Example 2 is additived with a stoichiometric amount (19.4 g) of PFPE diol having molecular weight 1000, equivalent weight 500. The formulation has a whitish-opalescent colour and consists of two distinct phases, which remain after gelling, also after addition of DBTDL.

EXAMPLE 5 (COMPARATIVE)
Synthesis of the Prepolymer Component 1.a) From a PFPE Diol Having Molecular Weight 500 With Trimer of IPDI In a 250 ml flask equipped with mechanical stirrer, thermometer, condenser and maintained under nitrogen atmosphere, 50 g of Vestanat® T 1890 and 25 g of anhydrous ethyl acetate are introduced. The mixture is heated up to 70° C. and dissolved under mild stirring. 10.2 g of PFPE diol having molecular weight 500 and hydroxyl equivalent weight 250, and 100 microlitres of a 5% solution of catalyst Dabco 131 in butyl acetate, are added. Heating is continued for 3 hours, then the fluorinated prepolymer solution containing free NCO groups is cooled and discharged.

The solution has the following properties:
Dry residue (determined as in Example 1): 81%
Equivalent weight NCO: 455 g/eq The prepolymer is diluted to 71% of dry product with the same solvent, obtaining a solution having equivalent weight NCO 516 g/eq and viscosity at 20° C. of 500 mPa.s.

EXAMPLE 6 (COMPARATIVE)
Preparation of a Formulation Formed by the Prepolymer of Example 5. Biuret of HDI and PFPE Diol Having Molecular Weight 500

A formulation containing 5 g of prepolymer of Example 5 (0.00968 eq. NCO, 3.57 g of dry product0) is prepared, using the corresponding solution diluted to 71%, 1.07 g of Tolonate HDB-LV, having viscosity lower than 5,000 mPa.s, and 3.88 g of PFPE diol having molecular weight 500 and equivalent weight 250 (total dry residue of the formulation: 85.6%). The obtained formulation at the temperature of 20° C. looks opalescent and is formed by two distinct phases. It is therefore not possible to obtain a transparent and homogeneously crosslinked film.

EXAMPLE 6A (COMPARATIVE)
Example 6 is repeated but by using as component 2) a PFPE diol having molecular weight 1,000.

The obtained result is the same of the one of Example 6.

EXAMPLE 7 (COMPARATIVE)
Synthesis of the Prepolymer Component 1.a) by Reaction of the PFPE Diol of Example 1 (Molecular Weight about 1.100), With the Biuret of HDI (Component 1.b)

In a 100 ml four-necked flask equipped with mechanical stirrer, thermometer, condenser and maintained under nitrogen atmosphere, 50 g of Tolonate HDB-LV, having viscosity lower than 5,000 mPa.s, 27 g of anhydrous butyl acetate and 30.92 g of PFPE diol having molecular weight Mn 1126, equivalent weight 566, are introduced. The mixture is heated up to 100° C. under stirring and 0.1 g of a 5% solution of Dabco 131 catalyst in butyl acetate are added. The temperature is maintained for one hour at 100° C., the solution is cooled and it is checked that the reaction is ended by $^{19}$FNMR (Example 1). The prepolymer solution has the following properties:
Dry residue (determined as in Example 1): 75.4%
Viscosity (20° C.): 1,890 mPa.s
Equivalent weight NCO: 490 g/eq

EXAMPLE 7A (COMPARATIVE)
Preparation of a Formulation Containing the Prepolymer Component 1.a) Obtained According to Example 7, the Trimer of IPDI as Component 1.b) and the PFPE Diol Having Molecular Weight 400

10 grams of the prepolymer obtained in Example 7 are additived with solid Vestanat T 1890 (6.37 g) so as to obtain a formulation containing the same weight ratio HDI/IPDI of Example 2. The mixture is heated under nitrogen atmosphere under stirring at 70° C. for 8 hours to dissolve Vestanat. When dissolution is over, 9.28 g of PFPE diol having molecular weight 400 are added, thus increasing the dry content of the solution to 90.4%. Under these conditions the formulation has a white colour due to the presence of two phases. The formulation is therefore not homogeneous. The obtained coating is not transparent and is not homogeneously crosslinked.

EXAMPLE 8 (COMPARATIVE)
Crosslinking of the Prepolymer Component 1.a) Obtained in Example 1 (PFPE Diol Having Molecular Weight 1,100 With the Trimer of IPDI) With ZDOL 400. in Absence of Component 1.b)

A formulation containing 10 g of prepolymer of Example 1 (0.0175 eq NCO), and 3.51 g of PFPE diol having molecular weight 400 and equivalent weight 200 is prepared. The formulation is macroscopically homogeneous at 20° C., with a dry product content of 84% and a viscosity of 1,600 mPa.s at 20° C. The formulation is additived with DBTDL (34 mg) and spread by a film-spreader (10 mils opening) on the same substrata mentioned in Example 2. The formulation is allowed to crosslink for 7 days at +18° C. and relatie humidity 50–60%. The obtained polymer film is analyzed by IR spectroscopy. The presence of a band at 2270–2260 cm-1, due to the free NCO groups, is observed in the spectrum.

Therefore the crosslinking of the formulation is not complete in absence of the biuret of HDI.

The chemical resistance evaluation with MEK is carried out on the coating, as explained in Example 2. After 30 double strokes the film is removed.

Crosslinking is continued on another sample, under the same conditions, for the total time of one month. This time elapsed, the IR analysis of the coatings shows that in the polymer films unreacted NCO groups are still present and therefore that crosslinking is incomplete. The crosslinking test is repeated by increasing the catalyst amount up to 1% by weight on the dry product of the composition. The final result, after one month of crosslinking, is equal to that previously obtained.

EXAMPLE 9 (COMPARATIVE)
Preparation and Crosslinking at 25° C. of a Formulation According to the Prior Art (EP 665,253)

A formulation is prepared formed by a mixture 1:1 (in hydroxyl equivalents) of hydroxyl bifunctional perfluoropolyether (I) having molecular weight 1,000 and equivalent weight 500 and of hydroxyl tetrafunctional perfluoropolyether (II) having equivalent weight 280 and by an isocyanic crosslinking agent adduct of the trimethylolpropane (TMP, 1 mole) with isophoron diisocyanate (IPDI, 3 moles) in butyl acetate. The formulation, which has a solvent content of 15%, is additived with catalyst DBTDL (0.55% w/w on the dry product) and applied by a film-spreading bar (10 mils opening) on an aluminum panel. Crosslinking is continued for 30 days at +25° C. and relative humidity 50–60%.

The IR analysis effected on the so obtained polymer film has shown a strong absorption band at 2270–2260 cm-1, showing the presence of unreacted NCO groups.

Chemical resistance (MEK test): The film is removed after 30 double strokes.

EXAMPLE 9bis (COMPARATIVE)
Preparation and Crosslinking at 25° C. of a Formulation According to the Prior Art (EP 812.891) Formed by the Component 1.a) Trimer of IPDI + PFPE Diol Having Molecular Weight 1,000, and PFPE Diol Component 2) Having Molecular Weight 1,000

In a 3-necked glass flask equipped with condenser, mechanical stirrer, nitrogen outlet, thermometer, 100 g of Vestanat T 1890 (0.4 eq of NCO), 112 g of anhydrous butyl acetate are introduced and the mixture is heated under stirring up to 70° C., until trimer dissolution. The perfluoropolyether diol having equivalent weight 490 (68.6 g equal to 0.14 eq of OH groups) and 5 mg of catalyst Dabco 131 are added. Heating is continued for 3 hours. The formation of the polymer is controlled by $^{19}$FNMR analysis (disappearance of the signals of the $CF_2$—$CH_2OH$ groups). 270 g of a solution containing a prepolymer with NCO terminations, having a dry residue of 60%, and an equivalent weight NCO equal to 1,210 g/eq and a viscosity of 400 mPa.s at 20° C. are discharged.

A formulation is prepared consisting of 10 g of the above obtained prepolymer, 4.02 g of perfluoropolyether diol having hydroxyl equivalent weight 490 and 0.12 g of a solution at 25% of DBTDL. The formulation, having a dry content of 70.5% at the application, is applied by a film-spreader on aluminum panels and crosslinked for 7 days at 25° C. The IR analysis carried out at the end on the polymer film shows that crosslinking is incomplete.

Chemical resistance (MEK test): the film is removed after 70 double strokes.

EXAMPLE 10
Synthesis of the Prepolymer Component 1.a) From a PFPE Diol Having Molecular Weight 1,000 and the Trimer of IPDI In a 4-necked glass flask equipped with stirrer, thermometer and condenser, 250 g of Vestanat T 1890 and 150 g of anhydrous butyl acetate are introduced under nitrogen atmoshpere. The mixture is heated up to 50° C. until complete dissolution of the reactants. The temperature is brought to 100° C. and 100 g of PFPE diol having number average molecular weight 1,000, hydroxyl equivalent weight 490, C2/C1 ratio=1 and functionality>1.98, and 500 microlitres of a 5% solution of Dabco 131, are fed in the order. Heating is continued for 2 h until complete conversion of the PFPE diol (check by $^{19}$F-NMR). The mixture is allowed to cool and the solution containing the prepolymer, having the following properties, is discharged:

Viscosity : 1480 mPa.s at 20° C.
Dry product: 70.8%
Equivalent weight NCO=612 g/eq

EXAMPLE 11
Crosslinking of a Formulation Formed by the Prepolymer of Example 10. by the Biuret of HDI and a PFPE Diol Having Number Average Molecular Weight 500

A formulation formed by 4.05 g of the prepolymer of Example 10, by 1.89 g of Tolonate HDB-LV having viscosity lower than 5,000 mPa.s and 4.35 g of PFPE diol having molecular weight 500, equivalent weight 250, C2/C1=1.2 and functionality 1.99, is prepared. The formulation looks limpid and transparent with the following properties:
Dry product : 88%
Viscosity at 20°: 750 mPa.s
Viscosity at 35°: 280 mPa.s
Viscosity at 50°: 130 mPa.s After dilution with butyl acetate, thus reducing the dry content to 80%, the viscosities determined at the same above mentioned temperatures, are the following:
Viscosity at 20°: 170 mPa.s
Viscosity at 35°: 80 mPa.s
Viscosity at 50°: 40 mPa.s The obtained viscosities show that the formulation with a dry product of 88% can be spray applied at the temperature of 35° C., while with a dry product of 80% the same application technique can be used also at room temperature. The formulation, after addition of dibutyltin dilaurate (0.27 g of a 5% solution in butyl acetate), is applied by a bar on glass, chromium-plated aluminum and white polyurethane primer panels, respectively, and allowed to cure at 18° C. for 7 days. The obtained polymer film looks homogeneous and transparent. The IR analysis does not show any absorption at the NCO band.

The obtained coating has the following properties:
Pencil hardness: HB
Buchholtz hardness: 77
Gloss (60°): 78
Bending (conic spindle) <3.13 mm
Contact angle ($H_2O$): 108°
Chemical reistance:>200 double strokes MEK

EXAMPLE 12
Synthesis of the Prepolymer from the Trimer of IPDI and PFPE Diol Having Mn 1,026

The procedure of Example 10 is followed by using the following amounts of reactants: Vestanat® P1890 7.0 Kg, PFPE diol having equivalent weight 516 and molecular weight 1,026, 2.95 Kg, ethyl acetate 3.3 Kg, Dabco 131 : 140 g of a solution at 5% in ethyl acetate. A prepolymer solution having 75% of dry product and the following analytical properties, is obtained:
equivalent weight: 583 g/eq
viscosity at 20° C.: 3200 mPa.s
viscosity at 50° C.: 310 mPa.s

EXAMPLE 12bis
Crosslinking of a Formulation According to the Invention Containing the Prepolymer Obtained According to Example 12, the Biuret of HDI and a Mixture of PFPE Diols Having Average Molecular Weight 550 and Bimodal Distribution of Molecular Weights A formulation is prepared which consists of 5.85 g of prepolymer of Example 12, 2.19 g of Tolonate HDB-LV having viscosity lower than 5,000 mPa.s and 5.78 g of a binary mixture of PFPE diols having average molecular weight 550, and formed for 5/6by a PFPE diol having molecular weight 500 and for 1/6 by a PFPE diol having molecular weight 1,026 (ref. Example 12). The obtained limpid and transparent formulation shows by the analysis the following properties:
Dry product: 89.56
viscosity at 20°: 2,100 mPa.s 0.74 g of DBTDL at 5% in PMA (propylenglycol methylether acetate), 0.88 g of PMA are added to said formulation. The mixture is applied by a film-spreading bar (10 mils opening) on very clean supports of the type described in Example 2A and it is allowed to crosslink for 7 days at 18° C. The obtained polymer film has the following properties:
Thickness: 38 micron
Pencil hardness: HB-F
Buchholtz hardness: 77–81
Adhesion (primer, chromium-plated aluminum). 100%
Gloss (60°): 80
Bending (spindle):<3.13 mm
Contact angle ($H_2O$): 110°
Chemical resistance>200 double strokes MEK EXAMPLE 13
Test for Determining the Pot-life of the Formulations of the Invention A formulation is prepared having 80% of dry product, containing 5.85 Kg of prepolymer obtained according to Example 12, 2.19 Kg of Tolonate HDB-LV having viscosity lower than 5,000 mPa.s, 5.78 Kg of the PFPE diol mixture used in Example 12 bis, 300 mg of $H_3PO_4$ and 1.62 Kg of PMA.

The formulation is subdivided in sealed phials having a 10 ml capacity. Half of the phials are kept at 20° C. and half at 50° C. At established times some phials are taken and the viscosity in the time is determined at each of the above indicated temperatures by a Brookfield mod. DVII viscometer. The obtained results are the following:
Viscosity at 20° C.:
 zero time: 240 mPa.s
 after 4 hours: 254 mPa.s
 after 8 hours: 270 mPa.s
After 48 hours, the viscosity of the formulation is still comparable with the above reported values.
Viscosity at 50° C.:
 zero time: 50 mPa.s
 after 4.5 hours: 70 mPa.s
 after 7.5 hours: 96 mPa.s
 after 24 hours: 370 mPa.s
 after 48 hours: 2100 mPa.s
The viscosity of the formulation at 50° C., even after 24 hours, has values which allow the use thereof by the spray technique.

EXAMPLE 14
Comparison Between the Properties of the Bicomponent Polyurethane Films Obtained According to Comparative Example 9bis (70.5% of Dry Product) and Example 12bis (85% of Dry Product) According to the Invention The formulations are applied by a film-spreader on glass, chromium-plated aluminum and white polyurethane primer panels, respectively. Crosslinking is carried out for 7 days at 20° C. and then for 8 hours at 50° C. The IR spectra of the obtained polymer films show that crosslinking is complete.

The transparent polymer films having a thickness between 30 and 50 micron, were subjected to the following determinations: tensile tests on self-supported films (detached from the support) according to ASTM D1708, abrasion resistance Taber according to ASTM D4060, tear strength Trauser according to ASTM D1938, cleanability ("no dirt pick up") with evaluation of ΔL (grey index) according to ASTM D2244. Table 1 shows the comparisons of the tensile tests carried out on the films obtained with the formulations of the two Examples 9bis (comparative) and 12bis according to the invention.

The polymer film obtained with the formulation of the invention, even though characterized by modulus and yield stress values lower than those obtained with the formulation of the prior art, shows clear hardening phenomena (stress at break values higher than those of the yield stress) at high elongation which are substantially absent in the prior art coating.

The compared data of the two films relating to the resitance to abrasion (Taber Test, grinder CS 10, 250 g/1000 cycles) and to the tear strength (Trouser tear, v=200 mm/min) show that the coatings obtained with the formulation according to the present invention have improved properties of resistance to abrasion and tear with respect to those obtained with the formulation of the prior art.

The cleanability test "no dirt pick up" consists in evaluating by colorimetric way (variation of the grey index ΔL according to ASTM D2244) the halo left on a white sample covered by the coating to be tested, dipped in a carbon black suspension in water, and subsequently dried for one hour at 70° C. in an airy stove. The test was repeated on the whole on No. 10 equal specimens. The removal of the stains obtained on the specimens has been carried out by cloth for 4 specimens and by water in an ultrasound bath for the other 6 specimens. The results are reported in Table 2 as an average value of the values found.

The invention films show improved "no dirt pick up" cleanability properties with respect to the coatings of the prior art since the found average variation of the grey index is lower than that of the films of the prior art.

TABLE 1

Comparison of the mechanical properties of the coatings obtained respectively with the formulation of Ex. 9b is (comparative) and 12b is according to the present invention

| Test | Coating from formulation Ex. 9bis (comp) | Coating from formulation Ex. 12bis |
| --- | --- | --- |
| Modulus (MPa) | 900–1,000 | 600–700 |
| Yield stress (MPa) | 35–36 | 16–20 |
| Yield strain % | 5–6 | 5–6 |
| Stress at break (MPa) | 28–30 | 22–26 |
| Elongation at break % | 50–80 | 120–140 |
| Resistance to abrasion (mg/Kcycle) | 20–30 | 13–15 |
| Resistance | 2.0 | 2.6 |

TABLE 1-continued

Comparison of the mechanical properties of the coatings obtained respectively with the formulation of Ex. 9b is (comparative) and 12b is according to the present invention

| Test | Coating from formulation Ex. 9bis (comp) | Coating from formulation Ex. 12bis |
|---|---|---|
| to tear (N/mm) | | |

TABLE 2

"No dirt pick up" cleanability test of the polymer film according to the prior art (formulation Example 9bis) and according to the invention (formulation Example 12bis)

| film according to the prior art | film according to the invention |
|---|---|
| −1.0 | −0.4 |

What is claimed is:

1. Compositions for coating having a dry content higher than 80% by weight, comprising polyisocyanates and (per) fluoropolyethers completely crosslinkable also in a range of temperatures between 5° C. and 20° C., said compositions comprising the following components:
    Component 1): mixture comprising:
        1.a) Partially fluorinated prepolymers, having free NCO groups, obtained by reaction of (per) fluoropolyethers (PFPEs) diols having number average molecular weight Mn in the range 800–1,500, with a cyclic trimer of the isophoronediisocyanate (IPDI), in said reaction the ratio in equivalents between the OH/NCO groups being in the range 0.20–0.25,
        1.b) biuret of hexamethylendiisocyanate (HDI) having an absolute viscosity at 20° C. lower than 5,000 mPa.s,
        in component 1) the ratio referred to the dry product between the compound 1.b) and the compound 1.a) being in the range 10–90 parts by weight of compound 1.b)/100 parts of compound 1.a);
    Component 2): (per) fluoropolyether (PFPE) diol having Mn in the range 350–700, the amount of PFPE diol component 2) being such that the ratio in equivalents between the OH and NCO groups in the composition is in the range 0.9–1.1;
    Component 3): inert organic solvent being the remaining part to 100% by weight of the composition.

2. Composition according to claim 1, wherein the component 1.a) is obtained by dissolving at 40° C.–80° C., the trimer of IPDI and the (per) fluoropolyether diol in inert organic solvent and maintaining the stoichiometric ratio in equivalents OH/NCO within the range 0.20–0.25 and a dry content in the range 65%–85% by weight of the above mixture of IPDI trimer, (per) fluoropolyether diol and solvent, by adding the polymerization catalyst and maintaining the reaction until reaching the theoretic NCO content.

3. Composition according to claim 1, wherein as component 2, (2a) mixtures of PFPE oligomer diols having Mn in the range 800–1,500, with PFPE oligomer diols having Mn in the range 350–700 are used, in said mixtures of oligomers the weight ratio between the high and low molecular weight oligomers, respectively, being in the range 1/2–1/10, or the number average molecular weight of the mixtures of PFPE diol oligomers being lower than or equal to 700.

4. Composition according to claim 1, wherein the component 3) is a solvent which does not react with the OH and NCO groups present in the composition of the invention.

5. Composition according to claim 4, wherein component 3 is an aprotic dipolar solvent.

6. Composition according to claim 1, wherein the (per) fluoropolyether diol compounds comprise one or more of the following (per) fluorooxyalkylene units

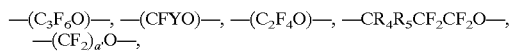

wherein Y is F or $CF_3$, $R_4$ and $R_5$ are equal to or different from each other and selected from H or Cl, a' is an integer equal to 3 or 4.

7. Composition according to claim 6, wherein the PFPE diols are selected from the following, wherein the (per) fluoropolyoxyalkylene units are statistically distributed along the chain:
    a1) —$(C_3F_6O)m'(CFYO)n'$— or —$(C_3F_6O)m'$ wherein the $(C_3F_6O)$ and $(CFYO)$ units are perfluorooxyalkylene units statistically distributed along the chain; m' and n' are integers such as to give the above mentioned molecular weights, and m'/n' are comprised between 5 and 40, n' being different from 0; Y is F or $CF_3$;
    b1) —$(C_2F_4O)p'(CFYO)q'$—$(C_3F_6O)t'$— or —$(C_2F_4O)p'(CFYO)q'$—
    wherein p' and q' are integers such that p'/q' ranges between 5 and 0.3 and such that the molecular weight is within the above mentioned range; t' is an integer with the meaning of m', Y=F or $CF_3$; q'/(q'+p'+t') or q'/(q'+p') is equal to 1/10 or lower and the t'/p' ratio ranges from 0.2 to 6;
    c1) —$CR_4R_5CF_2CF_2O$— wherein $R_4$ and $R_5$ are equal to or different from each other and selected from H or Cl, the molecular weight within the above mentioned range, a fluorine atom of the perfluoromethylene unit is optionally substituted with H or Cl, or perfluoroalkyl group, having from 1 to 4 carbon atoms;
    d1) —$(CF_2)_{a'}O$— wherein a' is an integer equal to 3 or 4.

8. Composition according to claim 6, wherein two end groups, equal to or different from each other, of the bifunctional (per) fluoropolyethers are

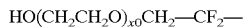

wherein x0 is an integer from 0 to 4, said end group being linked to the (per) fluorooxyalkylene unit by an oxygen atom but not by peroxidic sequences —O—O—.

9. Compositions according to claim 1 which are formulated both as monocomponent or as bicomponent.

10. Composition according to claim 9, wherein the bicomponent formulation comprises A (components 1.a+1.b) and B (Component 2), the solvent being added in A and/or in B.

11. Compositions according to claim 1, further containing additives.

12. Compositions according to claim 11, wherein the additives are selected from the group consisting of pigments and fillers, thixotropic agents, polymer dispersing agents selected from acrylic, silicone, polyurethane, polyamine, or having a carboxylic or non ionic functionality; stretching, anticissing, antifoam additives, additives to reduce photooxidation and hindered amines (HALS).

13. Compositions according to claim 12, wherein additives to reduce photooxidation are UV adsorbers.

14. Compositions according to claim 1 crosslinked by addition of a catalyst.

15. Composition according to claim 14, wherein the catalyst is selected from the groups consisting of:
 a) metal catalyst;
 b) amine catalyst; and
 c) organometal catalyst;
 the catalyst being added in concentrations ranging from 0.1 to 2% by weight with respect to the weight of the composition.

16. Composition according to claim 15, wherein the b) amine catalyst is selected from the group consisting of triethylendiamine, N-ethyl-ethylendiamine, tetramethylguanidine, dimethyl cyclohexylamine, and diazobicyclo octane;
 wherein the c) organometal catalyst is selected from the group consisting of dibutyltindilaurate, tin octanoate, cobalt naphthenate, vanadium acetylacetonate, dimethyltin-diethylhexanoate, dibutyltin diacetate, dibutyltin dichloride, and mixtures thereof.

17. Coating obtained by the compositions of claim 14.

* * * * *